DUAL-BEAM, SHORT-LINE STORAGE-TYPE CAMERA TUBE

Filed June 5, 1962

3,221,208

DUAL-BEAM, SHORT-LINE STORAGE-TYPE CAMERA TUBE

Sachio Takei and Masao Hibi, Kitatama-gun, Tokyo-to, Japan, assignors to Kabushiki Kaisha Hitachi Seisakusho, Tokyo-to, Japan, a joint-stock company of Japan Filed June 5, 1962, Ser. No. 200,086
Claims priority, application Japan, Aug. 1, 1961, 36/27,350
3 Claims. (Cl. 315—10)

This invention relates to storage-type camera tubes and particularly to a new storage-type camera tube in which a photoconductive effect is utilized.

In general, in a photoconductive type camera tube, since its photoconductive screen is causing storage of an electric charge during a frame period, it is necessary that its time constant be sufficiently large. For this reason, even if the photoconductive substance is highly sensitive, if its dark resistance is low, it cannot be used as a camera tube target. In this case, furthermore, increasing of the capacity of the screen in order to increase the time constant gives rise to the seriously inconvenient problem of after image.

It is a general object of the present invention to provide a new and improved, photoconductive storage-type camera tube which is free of the unfavorable features of conventional photoconductive type camera tubes.

More specifically, it is an object of the present invention to provide a storage camera tube wherein, instead of the conventional frame storage, storage during a period which is much shorter than the frame period is caused to be accomplished, whereby the storing time is shortened to a substantial degree.

It is another object of the invention to provide a new and practical, storage-type camera tube of the two-cycle scanning type.

The nature of the invention, its principle and details, as well as the manner in which the foregoing objects may best be achieved, will be best understood by reference to the following description when taken in conjunction with the accompanying illustrations in which like parts are designated by like reference letters, and in which.

Figure 1:
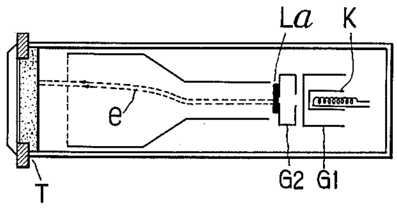
FIG. 1 is an elevational view, in longitudinal section and in diagrammatic form, showing one embodiment of the camera tube according to the invention.
Figure 2:
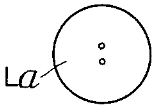
FIG. 2 is a view in the axial direction of an apertured disk for restricting the beam of an electron gun.

In the camera tube of the present invention, the specific picture elements of the photoconductive target are adapted to be scanned twice by an electron beam in one frame. As means for obtaining this operation, two beams *e* are emitted simultaneously as indicated in FIG. 1, and means are provided to cause the said two beams to scan, simultaneously with spacing therebetween of a certain number of scanning lines, a target T. In this case, the emission of two beams *e* is effected by providing, on the surface of an accelerating electrode $G_2$, an apertured disk L*a* for restricting electron beams which is formed with two holes closely spaced on the vertical axis as indicated in FIG. 2; or, two electron guns may be used. Furthermore, instead of two beams, a beam which is wide in the vertical direction may also be used with equal effect, such a beam being obtainable by joining the two holes in the aforesaid aperture disk L*a* so as to make a continuous, elongated hole.

The operational principle of the camera tube according to this invention as described above will now be described. The principal difference between the camera tube of this invention and a conventional camera tube of similar type is that, while in the conventional tube, the picture elements are scanned once during one frame period V, in the tube of the instant invention, the picture elements are scanned twice in the same period.

Figure 3:
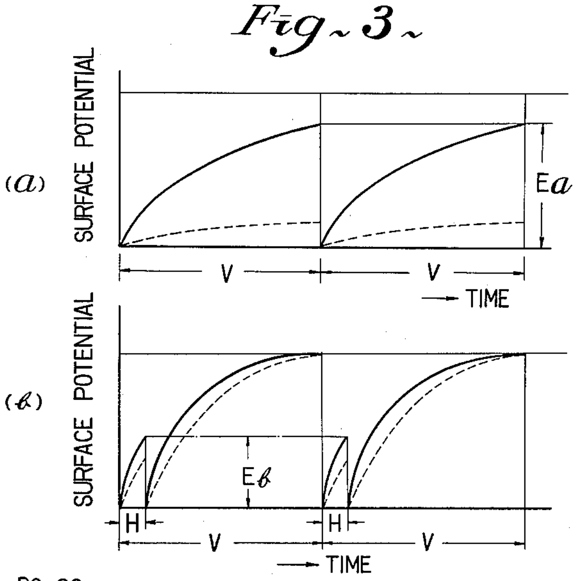
FIG. 3 is composed of two graphical representations, indicating the stages of recovery of the surface potential of the target specific picture element in the cases of the camera tube of the present invention and a conventional camera tube.

The curves shown in FIG. 3, which indicate the above relationship, represent the variations of surface potentials of the target specific picture elements. Graph *a*, representing the case of a conventional camera tube, indicates that, from the instant an electron beam passes a certain part, the surface potential at that part gradually recovers and approaches the signal electrode voltage. Since the target time constant in this case is sufficiently large, the surface potential, after one frame period, does not reach the signal electrode voltage, and the recovered surface potential E*a* corresponds to the quantity of incident light. Then, when this part is scanned again, the said recovered surface potential E*a* is discharged, the surface potential returns again to the cathode potential, and the above operation is repeated.

In comparison, Graph *b* of FIG. 3 represents the case of the camera tube of the present invention, wherein, in one frame period V, the target current is created twice. The target time constant in this case is made extremely small. Accordingly, when scanning is accomplished by the first beam, the recovery of the surface potential from the instant the beam passes a certain part is extremely rapid when compared to that of the conventional case. Then, if, at the instant the said surface potential has recovered to a certain degree, that is, at a time lagging behind the first beam by a time H corresponding to one to several horizontal scanning periods, the same part is scanned by a second beam, the surface potential E*b* recovered in the period H, representing the spacing between the scannings of the two beams, will be discharged, and the surface potential will return again to the cathode potential. Since the said surface potential E*b* corresponds to the quantity of incident light, the target current created by the scanning of the second beam becomes the output signal.

When the second beam passes, the surface potential, which has been returned to the cathode potential, begins its recovery and gradually approaches the signal electrode voltage. Then, since the time at which the next beam scanning occurs is approximately one frame period V theerafter ($H<<V$), the surface potential, in this interval, already reaches a signal electrode voltage which is independent of the quantity of incident light and assumes a saturated condition.

If, with the surface potential in this condition, the first beam is caused to scan again, the surface potential will return to the cathode potential, and the only target current flowing at this time will be a dark current. The above-described operation is repeated, and a target current conforming to the scanning of the second beam is taken out of the output terminal to accomplish camera pick-up operation.

Referring again to the curves of FIG. 3, the dotted lines indicate dark currents. The output signal of the camera tube of this invention consists of a substantially large dark-current component due to the scanning of the first beam and a storage signal component in one to several horizontal scanning lines which is caused to flow by the scaning of the second beam. However, since the said dark-current component is of a constant value, it can be easily removed by providing a direct-current breaker circuit. In the case of the said storage signal component, moreover, since a time constant of the photoconductive target of the order of one to several hundredths of that in the case of a conventional tube is sufficient, it is possible to use a photoconductive substance of low dark resistance. For example, by using a highly sensitive material such as CdS, an adequate signal quantity can be obtained.

Since the camera tube of this invention accomplishes storage in an interval which is much shorter than the frame period in the manner described above, it has the distinct advantage of greatly reducing after image which is a problem accompanying photoconductive targets.

Figure 4:
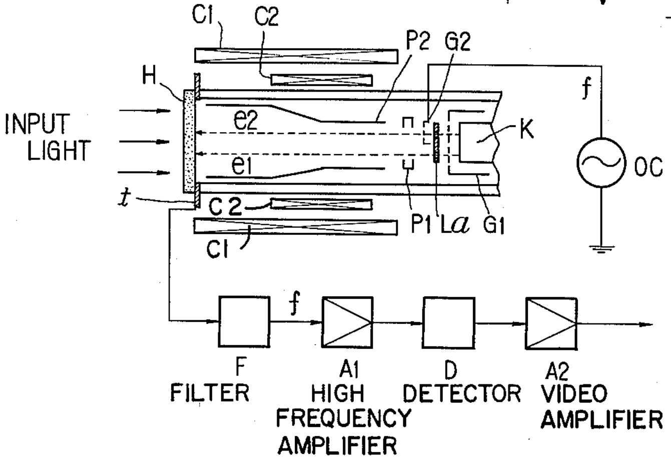
FIG. 4 is a schematic diagram indicating another embodiment of the camera tube according to the invention.

Another embodiment of the invention, as indicated in diagrammatic form in FIG. 4, provides extremely effective means for positively separating the signal component due to a first beam and the signal component due to a second beam and taking out only the signal component of the second beam. In this embodiment, the second electron beam is modulated by a high-frequency signal which is higher in frequency than video band width frequencies, and only the said modulated frequency component is taken out from the signal extraction electrode and detected. By such a functional method, it is possible to take out, in an extremely effective manner, only the signal component due to the scanning of the second beam.

The principal part of the camera tube apparatus shown in FIG. 4 is a camera tube assembly of the following construction. At the rear of the tube, an electron source K for emitting an electron beam is axially disposed and aimed toward the front end of the tube. An electron beam control electrode $G_1$ is disposed axially in front of the electron source K. An aperture disk L*a* having two holes for dividing the electron beam emitted by the electron gun into two beams $e_1$ and $e_2$ is disposed axially in front of the electrode $G_1$. A control electrode $G_2$ for the second beam $e_2$ is disposed in front of the aperture disk L*a*. Accelerating and focusing electrodes $P_1$ and $P_2$ for both beams $e_1$ and $e_2$ are axially disposed in front of the electrode $G_2$ and direct the beams against a photoconductive target H, which is connected to a signal leadout electrode *t*. The camera tube is encompassed concentrically by a deflection yoke coil $C_2$ and a focusing coil $C_1$. The electron beams $e_1$ and $e_2$ are subjected to deflection in the vertical direction at constant intervals and, simultaneously, in the vertical and horizontal directions.

The control electrode $G_2$ is connected to an oscillator OC which imparts to the electrode $G_2$ an output at a frequency *f* which is higher (for example: several tens of megacycles) than video signal band frequencies and modulates only the second beam $e_2$ with this high frequency *f*. Accordingly, a composite output consisting of a component due to the beam $e_1$ and a component due to the *f*-modulated beam $e_2$ appears at the signal extraction electrode *t*. The electrode *t* is connected to a high-frequency filter F which selectively takes out only the signal component which has been *f*-modulated (that is, the signal due to the beam $e_2$) from the composite signal appearing at the electrode *t*. The output of the filter F is directed through an amplifier $A_1$ to a detector D, thence to a video signal amplifier $A_2$ for amplifying the video signal of the output of the detector D.

Instead of providing an aperture disk L*a*, two electron guns may be provided from the beginning. Furthermore, the embodiment shown in FIG. 4 can be applied to a camera tube of the type wherein a target is used which is caused by high-speed scanning to generate secondary electrons in response to the input light quantity, and the said secondary electrons are detected and transformed into video signal.

By the above-described arrangement of the embodiment shown in FIG. 4, the signal component due to a first beam and the signal component due to a second beam can be separated by high-frequency modulation of the second beam, and only the video signal component due to the second beam can be positively extracted, whereby a practical, two-cycle scanning type, storage camera tube can be produced.

Although this invention has been described with respect to particular embodiments thereof, it is not to be so limited as changes and modifications may be made therein which are within the full intended scope of the invention, as defined by the appended claims.

What is claimed is:

1. A storage type camera suited for video signals and having a plurality of frame periods which comprises, in combination, a vacuum container; a target exhibiting photoconductivity upon receiving an optical image radiated from the outside and having an extremely small time constant, disposed at one end of said container; means for simultaneously generating a first and a second electron beam near the opposite end of said container; said beams successively scanning said target at a time interval substantially shorter than one frame period; and means for leading out, as an output signal, the electric current, derived during said second scan, from said target.

2. A storage type camera suited for video signals and having a plurality of frame periods which comprises, in combination, a vacuum container; a target exhibiting photoconductivity upon receiving an optical image radiated from the outside and having a time constant of one to several hundredths, disposed near the opposite end of said container; a doubly perforated disc in front of said source, to divide the electron beam emitted from said source into a first and a second beam; said beams successively scanning said target at a time interval substantially shorter than one frame period; and means for leading out, as an output signal, the electric current, derived during said second scan, from said target.

3. A storage type camera suited for video signals and having a plurality of frame periods which comprises, in combination, a vacuum container; a target exhibiting photoconductivity upon receiving an optical image radiated from the outside and having a time constant of one to several hundredths, disposed at one end of said container; a single electron source disposed near the opposite end of said container; a doubly perforated disc in front of said source, for dividing the electron beam emitted by said source into a first and a second beam; means for modulating said second beam to a signal of a frequency higher than video signals, said first and second beams successively scanning said target at a time interval substantially shorter than one frame period; and means for leading out, as an output signal, only said modulated frequency as an output signal, as an electric current, derived during said second scan, from said target.

References Cited by the Examiner

UNITED STATES PATENTS

| | | | |
|---|---|---|---|
| 2,260,911 | 10/1941 | Knick et al. | 315—13 X |
| 2,555,824 | 6/1951 | Schade | 315—11 |
| 2,896,017 | 7/1959 | Partin | 178—5.4 |

OTHER REFERENCES

Dresner-RCA T.N. No. 367, June 10, 1960 (2 shts.).

DAVID G. REDINBAUGH, *Primary Examiner.*

ROBERT SEGAL, *Examiner.*